United States Patent
Shirai

(10) Patent No.: US 9,354,832 B2
(45) Date of Patent: May 31, 2016

(54) PRINT SYSTEM FOR RECOVERING A PRINT JOB IN A REDUNDANT PRINT SERVER, PRINT SERVER AND PRINT CONTROL METHOD

(71) Applicant: CANON KABUSHIKI KAISHA, Tokyo (JP)

(72) Inventor: Kenichi Shirai, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/679,342

(22) Filed: Apr. 6, 2015

(65) Prior Publication Data

US 2015/0293734 A1 Oct. 15, 2015

(30) Foreign Application Priority Data

Apr. 14, 2014 (JP) ................... 2014-083106

(51) Int. Cl.
*G06F 3/12* (2006.01)

(52) U.S. Cl.
CPC .............. *G06F 3/1259* (2013.01); *G06F 3/121* (2013.01); *G06F 3/1234* (2013.01); *G06F 3/1285* (2013.01)

(58) Field of Classification Search
CPC .................................................. G06F 3/1259
USPC .......................................................... 358/1.15
See application file for complete search history.

(56) References Cited

U.S. PATENT DOCUMENTS

| | | | |
|---|---|---|---|
| 6,369,907 B1 * | 4/2002 | Aoki ..................... | G06F 3/1204 358/1.15 |
| 6,631,008 B2 * | 10/2003 | Aoki ..................... | G06F 3/1203 358/1.13 |
| 7,538,902 B2 | 5/2009 | Kurotsu et al. | |
| 7,719,703 B2 | 5/2010 | Kurotsu et al. | |
| 2003/0128384 A1 * | 7/2003 | Nelson .................. | G06F 3/1217 358/1.15 |
| 2009/0059284 A1 * | 3/2009 | Kitagata ............... | G06F 3/1204 358/1.15 |
| 2012/0327454 A1 | 12/2012 | Hasama | |

FOREIGN PATENT DOCUMENTS

JP    2013-8155 A    1/2013

\* cited by examiner

*Primary Examiner* — Jacky X Zheng
(74) *Attorney, Agent, or Firm* — Fitzpatrick, Cella, Harper & Scinto

(57) ABSTRACT

By saving the print job status in a shared database and switching the print job recovery method depending on the status, it is possible to obtain a printed result desired by the user without storing print data in the common database at the time of the occurrence of a failure.

11 Claims, 8 Drawing Sheets

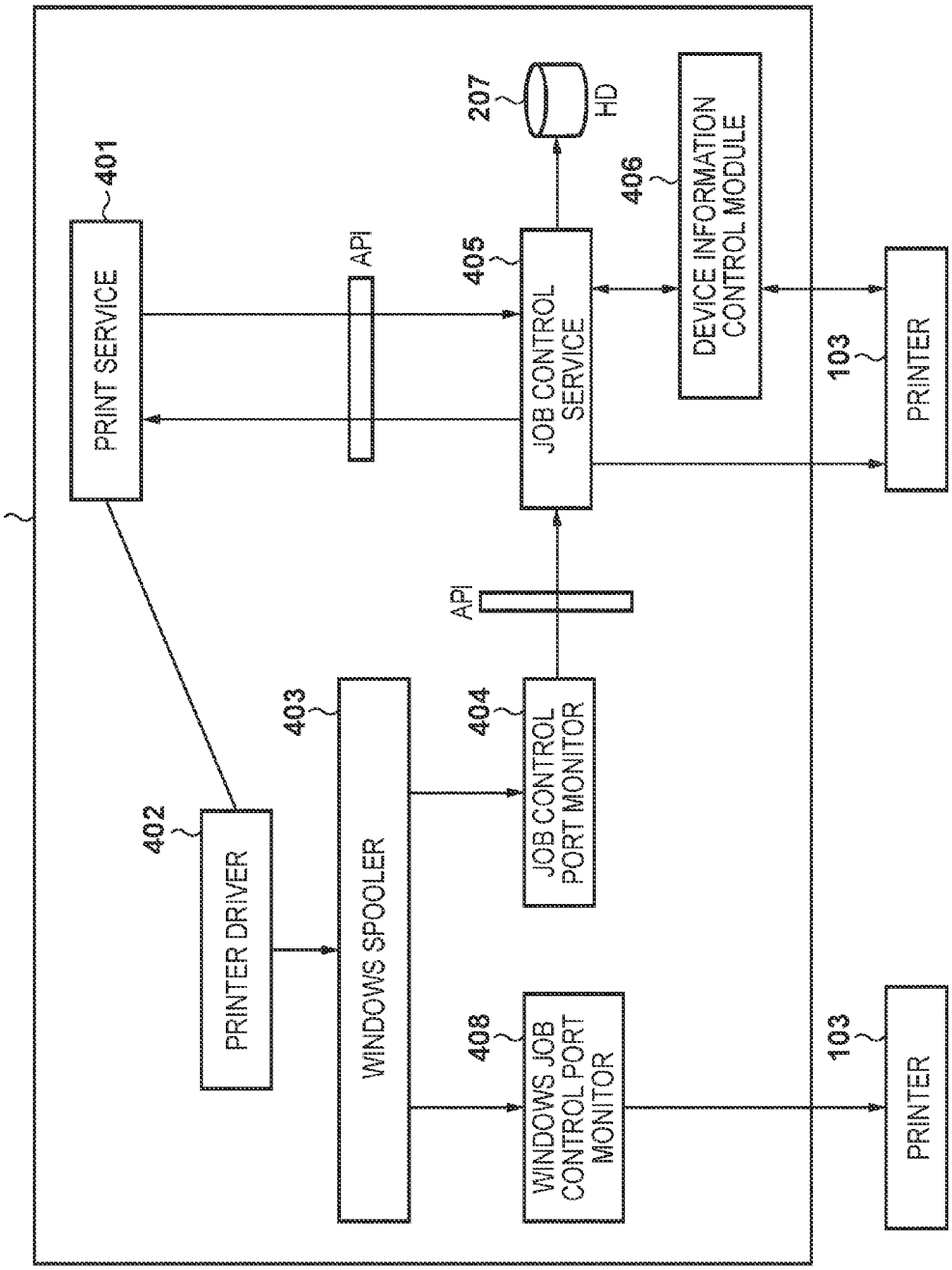

PRINTER INFORMATION

JOB INFORMATION

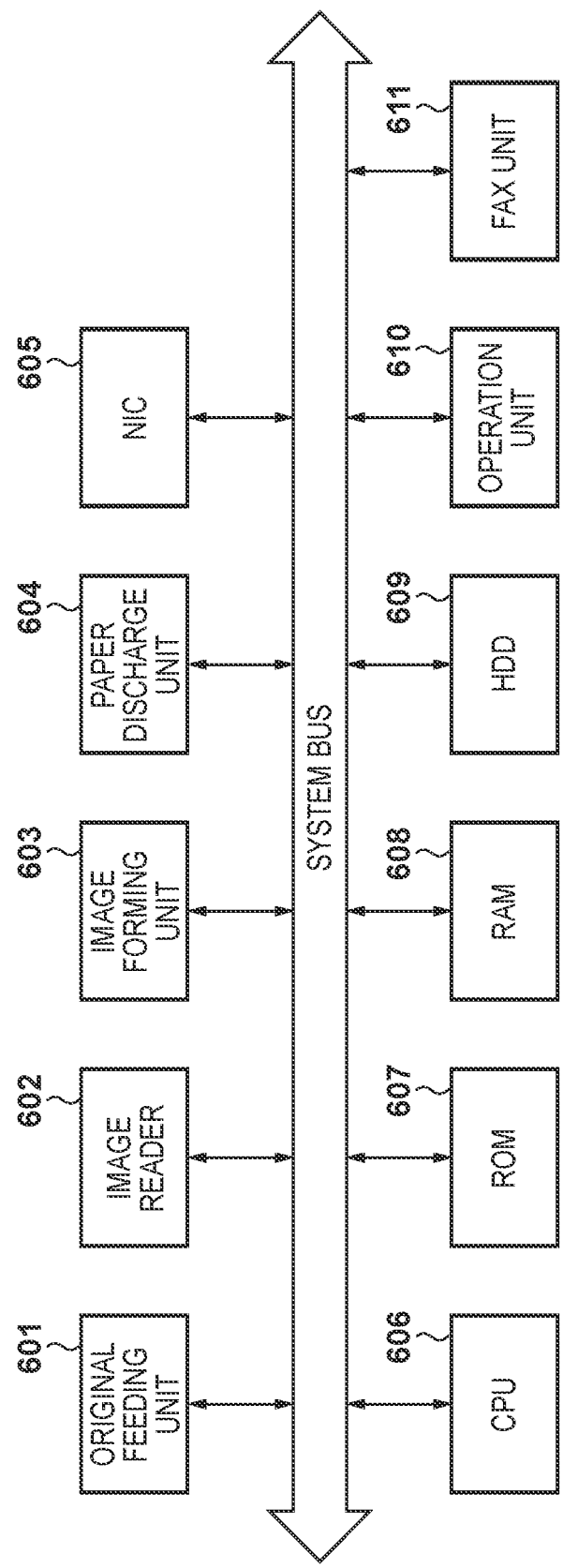

PRINT SYSTEM FOR RECOVERING A PRINT JOB IN A REDUNDANT PRINT SERVER, PRINT SERVER AND PRINT CONTROL METHOD

BACKGROUND OF THE INVENTION

1. Field of the Invention

The present invention relates to a print system, a print server and a print control method, and more particularly to a recovery method for recovering a print job in a redundant print server, and the like.

2. Description of the Related Art

With a conventional print system including a plurality of servers, it is necessary to control the order of printing, and thus a single server is given responsibility for print data generation processing and print job management for each printer. This configuration, however, requires print data to be saved in a common database or the like in order to perform print job recovery in another server in the event of the occurrence of a failure in the server that is responsible for printer management. For example, Japanese Patent Laid-Open No. 2013-008155 discloses a method in which print data is retracted into another server upon shut-down of the OS so that the other server that has retracted the print data can take over to continue the processing.

This related art technique works well if the OS is normally shut down, but if the retraction of print data fails, such as for example, if the OS is abruptly shut down by an accident or a service in the print server is abruptly shut down, it is not possible to continue print processing. In addition, with a print system that supports high volume-printing, there is a possibility that if a shared database is heavily accessed in order to, for example, write print data when saving print data into the shared database, data writing creates a bottleneck for the practical use of the print system. Also, if a failure occurs after printing has started and another server continues the print processing, a problem of making duplicated printouts occurs.

SUMMARY OF THE INVENTION

The present invention has been made in view of the problems encountered with the conventional techniques, and the present invention provides a print system, a print server and a print control method that solve the above-described problems by performing recovery processing for recovering a failed server in the event of the occurrence of a failure in the print server without sharing of print data in a shared database or the like.

The present invention includes the following aspects.

According to an aspect of the present invention, there is provided a print system comprising: a plurality of print servers; a monitor unit configured to monitor an operating status of the print servers; and a database configured to store document data, wherein each of the print servers includes: a storing unit configured to, in response to a print request, store association information in the database, the association information being information in which a print server performing print processing, a printer and a print job are associated with each other; and a print unit configured to generate a print job based on the document data, and transmit the print job to a designated printer so as to execute the print job, the monitor unit is further configured to, if a failure occurs in a first print server, notify a second print server of the failed first print server, and the second print server is configured to specify a target printer and a target print job that are associated with the first print server based on the association information, generate the specified print job based on the document data, and transmit the print job to the specified printer so as to execute the print job.

Alternatively, according to another aspect of the present invention, there is provided a print server connected to at least one other print server, a monitor unit configured to monitor an operating status of the print servers, and a database configured to store document data, the print server comprising: a storing unit configured to, in response to a print request, store association information in the database, the association information being information in which a print server performing print processing, a printer and a print job are associated with each other; and a print unit configured to generate a print job based on the document data, and transmit the print job to a designated printer so as to execute the print job, wherein a notification indicating that a failure has occurred in the other print server is received from the monitor unit, and a target printer and a target print job that are associated with the first print server are specified based on the association information, the specified print job is generated based on the document data, and the print job is transmitted to the specified printer so as to execute the print job.

According to the present invention, in redundant print servers, recovery processing for recovering a failed server can be performed by another print server without sharing of print data in a database or the like, and thus the user can obtain desired printouts.

Further features of the present invention will become apparent from the following description of exemplary embodiments with reference to the attached drawings.

BRIEF DESCRIPTION OF THE DRAWINGS

FIG. 4 is a diagram showing print processing in a print system.

FIG. 6 is a diagram showing an example of a hardware configuration of a printer 103.

DESCRIPTION OF THE EMBODIMENTS

Hereinafter, preferred embodiments for carrying out the present invention will be described with reference to the drawings.

Embodiment 1

System Configuration

Figure 1:
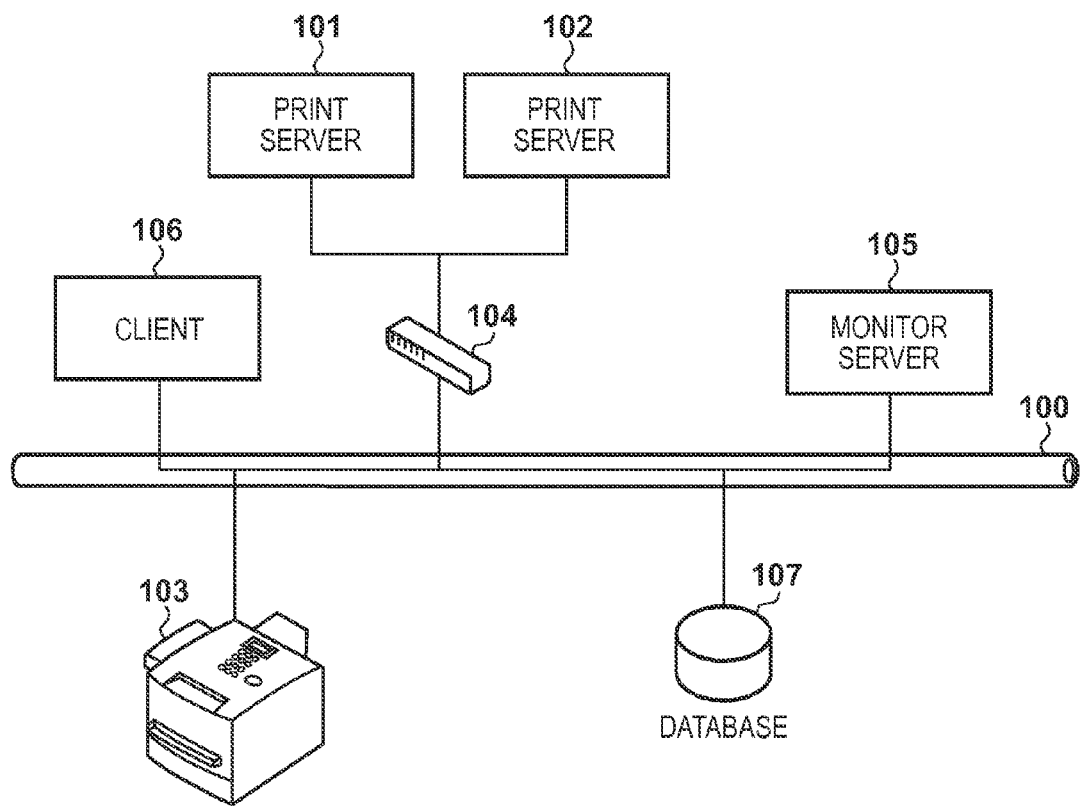
FIG. 1 is a diagram showing an overall configuration of a print system.

FIG. 1 is a diagram showing an overall configuration of a print system according to an embodiment of the present invention. This diagram shows one printer 103 and one client terminal 106, but in fact a plurality of printers 103 and a plurality of client terminals 106 are connected. Also, print servers 101 and 102 are connected to a load balancer 104, and are configured to receive requests from a client terminal 106 and the like via the load balancer 104. FIG. 1 shows only the print servers 101 and 102 as print servers, but the present embodiment is constructed based on the assumption that more print servers are connected to the load balancer 104. Also, the communication performed between the apparatuses included in the present embodiment may be wired communication using an Ethernet® cable, or may be wireless communication using radio waves, light or the like.

As shown in FIG. 1, the printer 103, the load balancer 104, a monitor server 105 and the client terminal 106 are connected via a network 100. The network 100 is a so-called communication network, which is implemented by, for example, a LAN such as the Internet, a WAN, a telephone line, a dedicated digital line, an ATM or frame relay line, a cable television line, a data communication wireless line, or a combination thereof. The network 100 may be any network as long as it is possible to perform transmission and reception of data. The way of communication from the client terminal 106 to the print servers 101 and 102 and the printer 103 and the way of communication from the printer 103 to the print servers 101 and 102 may be different. The client terminal 106 may be, for example, a desktop computer, a notebook computer, a mobile computer, a PDA (personal data assistant) or the like. Alternatively, the client terminal 106 may be a mobile phone having a program operating environment. The client terminal 106 has an environment for operating programs such as a web browser (an internet browser, a WWW browser, a browser used to access the World Wide Web). The print servers 101 and 102 receive information for identifying document data to be printed and information for designating an output printer together with a print request from a web browser of the client terminal 106 via the load balancer 104, and causes the output printer to perform printing. The print servers 101 and 102 also perform monitoring and managing of the printer 103, control and monitoring of print jobs, and transfer of print jobs to the printer 103. As shown in FIG. 1, the print servers 101 and 102 are configured to be able to be redundant by the load balancer 104 so as to virtually function as one print server. To be specific, a print application of the client terminal that performs printing transmits a print request to the load balancer 104 that functions as if it is a single print server, without identifying the print servers 101 and 102. The monitor server 105 monitors the operating status of the print servers 101 and 102, and upon detection of the occurrence of a failure in any one of the print servers, the monitor server 105 issues a notification indicating that a failure has occurred to another print server. In the present embodiment, there is no particular limitation on the method for monitoring the print servers performed by the monitor server 105, and for example, the monitor server 105 can regularly poll the status of the print servers, or use SNMP trap messages. A database 107 is a large-capacity storage device, and stores therein documents, document information, printer information 500 and print job information 510 used by the print servers.

Hardware Configuration

Figure 2:
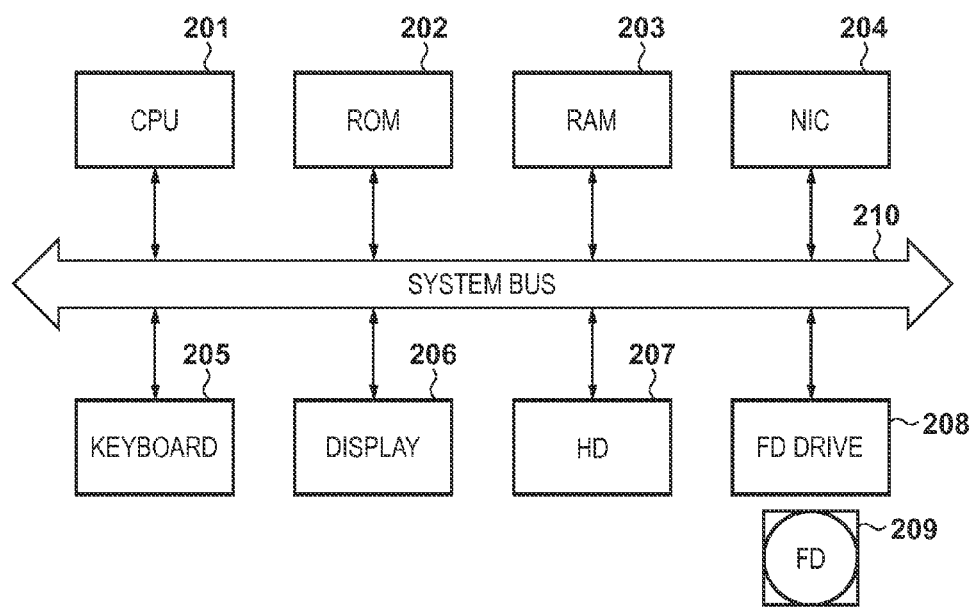
FIG. 2 is a hardware configuration diagram of print servers 101 and 102.

FIG. 2 is a hardware configuration diagram of the print servers 101 and 102, the monitor server 105, the client terminal 106 in the print system according to an embodiment of the present invention. Unless otherwise stated, the present invention is applicable to any single device and any system including a plurality of devices as long as the functions of the present invention can be executed. In addition, unless otherwise stated, the present invention is also applicable to a system that is connected via a network such as a LAN or a WAN and performs processing as long as the functions of the present invention can be executed.

A CPU 201 is a control unit of an information processing apparatus, and is configured to execute an application program, a print driver program, an operating system and a print system program of the present embodiment that are stored in a HD 207. The CPU 201 also performs control so as to temporarily store information, files and the like required to execute the programs in a RAM 203. The CPU 201 also opens various types of registered windows based on a command pointed by a mouse cursor (not shown) or the like on a display 206 and executes various types of data processing. In the present embodiment, printer preparing processing is performed through a window displayed on the display of the client PC. A ROM 202 is a storage unit in which programs such as a basic I/O program, and various types of data such as font data used in document processing and template data are stored. The RAM 203 is a temporary storage unit, and functions as a main memory, a work area and the like for the CPU 201. An interface 204 is an input/output unit, and the information processing apparatus performs data exchange with an external apparatus via the interface 204.

A keyboard 205 is an instruction input unit for the user to issue instructions to the print servers and the like. The display 206 is a display unit configured to display a command and the like input through the keyboard 205. A hard disk (HD) 207 is an external storage unit that functions as a large-capacity memory and stores therein an application program, a print driver program, an OS and the like. FIG. 2 shows a Floppy® disk (FD) 209 and a drive (FDD) 208 as removable storage media, but it is also possible to use other recording media such as an optical recording medium, a magneto-optical recording medium and a magnetic recording medium. The CPU 201 to the FD drive 208 are connected with a system bus 210.

Figure 3A:
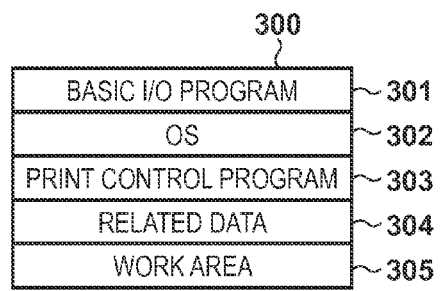
FIGS. 3A and 3B are diagrams showing an example of a memory map of a RAM 203.
Figure 3B:
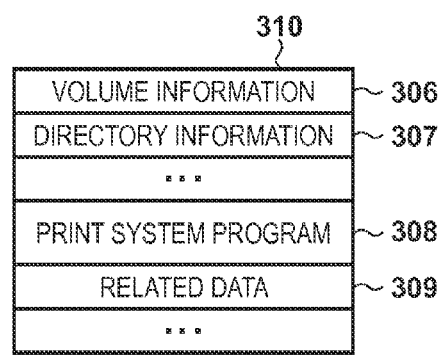

FIGS. 3A and 3B are diagrams showing an example of a memory map of the RAM 203 shown in FIG. 2, and specifically, a memory map in which a print control program loaded from the FD 209 has been loaded onto the RAM 203 and has become executable. In the present embodiment, an example is shown in which the print control program is loaded together with related data from the FD 209 directly into the RAM 203 and executed, but other than this configuration, it is also possible to use a configuration in which the print control program is loaded into the RAM 203 from the HD 207 in which the print control program has been installed. Also, the print control program of the present embodiment may be stored in media other than the FD such as a CD-ROM, a CD-R, a PC card, a DVD and an IC memory card. Furthermore, the print control program of the present embodiment may be stored in the ROM 202 so as to constitute a part of the memory map, and executed directly by the CPU 201. The print control program of the present embodiment may also be configured as software that implements functions that are similar to those of the apparatuses described above, as an alternative to the hardware apparatuses.

A basic I/O program 301 is an area storing therein a program having an IPL (initial program loading) function or the like that, upon the information processing apparatus being turned on, reads the OS from the HD 207 into the RAM 203 and starts the OS to perform operation. An operating system (OS) 302 is a program that executes resource management of the computer or the like. A print control program 303 according to the present embodiment is stored in an area allocated on the RAM 203. Related data 304 is stored in an area allocated on the RAM 203. A work area 305 is a work area for the CPU 201 to execute the print control program of the present embodiment. A memory map 310 is an example of a memory map of the FD 209 shown in FIG. 2, and indicates the content of data stored in the FD 209. Volume information 306 indicates data information. Directory information 307 indicates the structure of directory. A print system program 308 of the present embodiment is, under control of the OS 302, loaded into the RAM 203, expanded as the print control program 303, and executed by the CPU 201 of the print server 101 or 102 so as to implement the procedures shown in FIGS. 8 and 9 as a part of a print service 401, which will be described later. Related data 309 is the related data of the print system program 308. The print system program 308 is a program constructed based on the flowcharts explained in the present embodiment. In the present embodiment, the print servers 101 and 102 have the same configuration.

Print System

Print processing performed in the print system according to the present embodiment will be described next. The print processing of the print system is executed with the print control program 303 described above. Each software module of the print control program 303 is stored in the HD 207, and loaded into the RAM 203 and executed by the CPU 201.

Processing of Print Job

FIG. 4 is a diagram showing a software configuration of the print system according to an embodiment of the present invention, in particular, a software configuration related to the print processing of the print servers 101 and 102. In the diagram, two printers 103 are shown, but this is merely for convenience of illustration, and thus there is one printer 103. Upon receiving a print request from the web browser of the client terminal 106, the print service 401 acquires a document saved in the database 107. Next, the print service 401 generates a series of rendering commands that constitute a print job by operating the graphic function of the OS on the acquired document, and passes the generated rendering commands to a Windows® spooler 403 via a printer driver 402. The Windows® spooler 403 passes the print job data (print data) generated by the printer driver 402 to a port monitor selected by the user, and takes a procedure so as to transmit the print job data to the printer. In the present embodiment, the user has, in advance, designated a print system port monitor (hereinafter, referred to as a "job control port monitor") 404, and issued a print instruction. As used herein, the user may be, for example, the print service 401. The user may be the user of the client terminal 106, but in this case, the user who issued the print request has to be aware of the port monitor 404. In order to eliminate the need for the user to know the details of the print servers 101 and 102, it is desirable that the print service 401 designates the port monitor 404.

The printer driver 402 that has received the rendering commands from the print service 401 generates data that can be processed by the printer, such as for example, print data written in a page description language (PDL), PDF or the like, and transmits the print data to the job control port monitor 404, rather than to a port monitor 408 that is configured to transmit print data to the printer 103. The job control port monitor 404 transmits the print data to a print system job control service 405, rather than to the printer 103. The job control service 405 transmits the received print data to the printer 103. The job control service 405 also stores the received print data in a storage unit such as the hard disk (HD) 207. The print data is stored in the HD 207 until the job control service 405 determines that the job has been completed, for example, until the job control service 405 determines that printing of the print job has been completed.

The job control service 405 further performs communication with a device such as the printer 103 by using a device information control module 406, and manages information such as device status, job status and the like that are notified from the device. The job control service 405 also has a function of issuing predetermined commands to the device. For example, the job control service 405 acquires the status of each device (print apparatus) with which communication is possible, the status being information indicating "printing in progress", power control state, failure information (paper jam), information regarding paper supply units, or the like. The job control service 405 also obtains information regarding print jobs in each printer, and the operation conditions, and performs operations such as suspending a print job and cancelling a print job. The print service 401 and the job control service 405 exchange print job information and the status of the printer 103 via a software interface (API). The print service 401 updates the printer information 500 and the print job information 510 stored in the database 107 where necessary.

Printer Information and Job Information

Figure 5A:
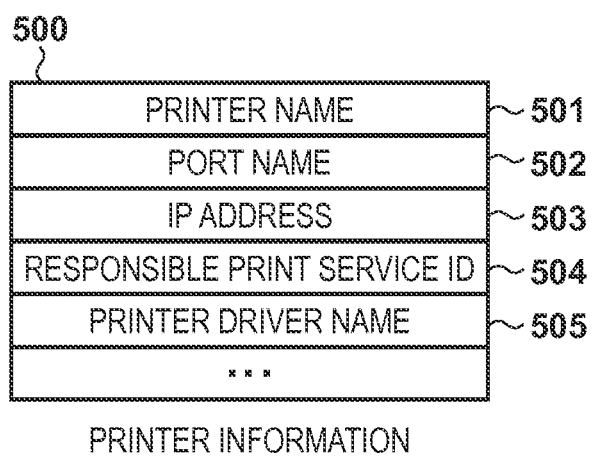
FIGS. 5A and 5B are diagrams showing an example of a memory map indicating printer information 500 and print job information 510 used by a print service 401.
Figure 5B:
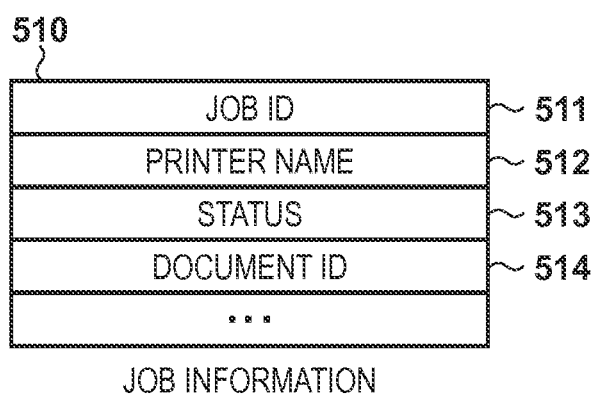

FIGS. 5A and 5B show an example of a memory map indicating the printer information 500 and the print job information 510 used by the print service 401 in the present embodiment. The printer information 500 and the print job information 510 are stored in the database 107 and updated by the print service 401. The print service 401 holds the printer information 500 with respect to the printer 103 (or each printer in the case where there are a plurality of printers) that is managed by the print service 401. The print service 401 also holds the print job information 510 with respect to each print job. The print service 401 updates the printer information 500 when the user registers the printer 103, or when the print service that is responsible for the printer 103 is changed, which will be described later. Also, the print service 401 updates the print job information 510 stored in the database 107 in response to a notification of print job information from the job control service 405. In the present embodiment, upon receiving a print request by the print service 401, the printer information 500 is passed to the job control service 405, and the job control service 405 specifies an output printer based on the received information, and transfers and monitors the print job.

In the printer information 500, printer name 501 indicates a printer object name of the printer 103 managed by the print service 401. The printer name is also set in the print job information 510, which will be described later, upon receiving a print request. Port name 502 indicates information for the job control service 405 to identify the printer 103, which is an output printer. IP address 503 indicates the network address of the printer 103. Responsible print service ID 504 indicates information for identifying a print service that is responsible for the printer from among a plurality of print services. In the present embodiment, because the print servers are configured to be able to be redundant, if a plurality of print servers cause one printer to perform print processing, the order of printing is disordered. For this reason, the present embodiment uses a method in which the print service 401 that first received a request sets its identifier in the responsible print service ID of the printer information 500, and deletes the information set in the responsible print service ID upon completion of print processing. Accordingly, only one print service uses one printer at a time. The identifier of the print service 401 is information that is generated upon activation of the print service 401 and held by the print service, and is uniquely assigned in the print system. As long as one print service is operated in one print server, the identifier of the print server may be used as the identifier of the print service. Printer driver name 505 indicates information regarding the printer driver 402 used by the printer specified by the printer information 500. Upon receiving a print request, the print service 401 issues a print command to the printer driver identified by the printer driver name 505.

Job ID 511 is issued by the job control service 405 upon receiving print data from the job control port monitor 404, notified from the job control service 405 to the print service 401, and then set in the print job information 510. Status 513 is information indicating job status. Examples of the job status include "spooling in progress", "waiting for transfer", "transfer in progress", "transfer completed", "printing in progress", "printing completed" and "error". Each time there is a change, the job status is notified from the job control service 405 to the print service 401, and the print job information 510 is updated. Document ID 514 is an ID for specifying a document based on which the print job was generated in the database 107, and is set by the print service 401. The printer information 500 and the job information 510 associate the print service (or print server), the printer used by the print service to perform printing and the print job executed by the printer, and thus may also be referred to as "association information".

Hardware Configuration of Printer

FIG. 6 is a diagram showing an example of a hardware configuration of the printer 103. An image reader 602 includes a scanner and the like, and is configured to optically read an original image and convert the read original image into digital image information. The image reader 602 also outputs the digital image information to an image forming unit 603 so as to form an image, or passes the digital image information to a fax unit 611, an NIC 605 or the like to transmit the digital image information via a communication line. In the present embodiment, the image reader 602 and the fax unit 611 are additional elements, and thus they are not necessarily provided. The image forming unit 603 executes a series of image forming processes including handling of paper, image transfer, image fixing and the like, and forms an image on a recording medium such as recording paper. The image forming unit 603 includes, for example, an inkjet printer or an electrophotographic image forming unit. A paper discharge unit 604 discharges printed paper, and performs processing such as sorting and stapling on the printed paper. The NIC (network I/F) 605 establishes connection with the LAN and the Internet via a network, and performs information exchange with external apparatuses. A CPU 606 controls each processing in this apparatus (printer) by reading a program stored in a ROM 607 or a HDD 609 into a RAM 608 and executing the processing based on the program. The ROM 607, which is a non-volatile storage unit, stores therein programs and data related to each processing in this apparatus. The rewritable RAM 608 electrically stores temporary data related to each processing in this apparatus. The HDD 609 stores therein programs and data related to each processing in this apparatus, as well as temporary data, and the like. An operation unit 610 displays a screen and receives an operation instruction from the user via the screen. The fax unit 611 executes processing such as transmission and reception of facsimile images, or to be specific, transmits digital image information read by the image reader 602, or decodes a received facsimile signal and records the signal in the image forming unit 603.

Software Configuration of Printer

Figure 7:
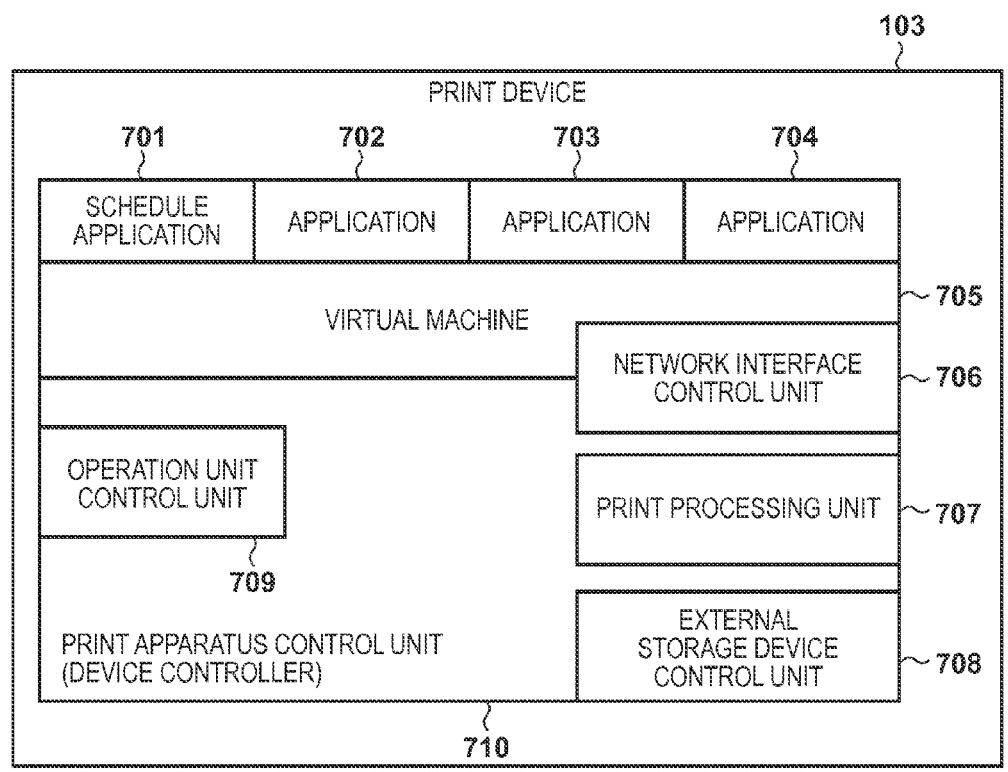
FIG. 7 is a diagram hierarchically showing a configuration of the printer 103.

FIG. 7 is a diagram hierarchically showing a software configuration of the printer 103. In FIG. 7, a device controller 710 controls the operations of the image forming unit 603 and the image reader 602, specifically, for example, performs control so as to cause the image forming unit 603 to copy information regarding the original read by the image reader 602. Also, the device controller 710 includes a network interface control unit 706, a print processing unit 707 and an operation unit control unit 709, and performs control on information exchange between these units. The print processing unit 707 performs control such as, for example, processing print data input via the network interface control unit 706 and outputting the print data to the image forming unit 603 so as to perform printing. The network interface control unit 706 performs control on data transmission and reception with respect to another communication terminal via a communication line. The data that is transmitted and received includes, in addition to print data, information regarding the printer and the job status. The operation unit control unit 709 performs control so as to generate a signal corresponding to a user operation input through an operation panel of the operation unit 610, or display various types of data, messages and the like on the operation unit 610 (or display unit) or the like. A virtual machine 705 is located above the device controller 710, and is configured to control the device controller 710. The network interface control unit 706 is configured such that it can be used directly from both the device controller 710 and the virtual machine 705, and the device controller 710 and the virtual machine 705 can independently access an external network. Furthermore, there are, above the virtual machine 705, applications written in a programming language corresponding to API (Application Programming Interface) provided by the virtual machine 705. These applications can indirectly act on the device controller 710 via the virtual machine 705 and cause the image forming unit 603 and the image reader 602 to perform operations. In the present embodiment, a schedule application 701 is provided as one of the applications. The schedule application 701 performs scheduling of a print job in response to a request from the job control service 405, and notifies the state of job in the printer and the state of the printer. In the present embodiment, the job control service 405 sends a schedule request to the schedule application 701 before transferring a print job, and starts transferring the print job upon receiving a schedule notification from the schedule application 701. These applications are also configured to be capable of being uninstalled from the virtual machine 705, or being installed as new applications 702 to 704. Also, in the present embodiment, the above-described applications have been described as applications that are installed in the printer 103, but they may be provided as hardware. The applications may also be provided as applications installed on a computer serving as an external apparatus connected to the printer 103 so as to be capable of communication. An external storage device control unit 708 converts the image read by the image reader 602 into a data format that can be saved in an external storage device by the image forming unit 603, and saves the image in the HDD 609. The external storage device control unit 708 also reads the data saved in the external storage device, and performs print processing via the image forming unit 603 and network transmission to the outside via the network NIC 605.

Print Job Recovery Processing

Figure 8:
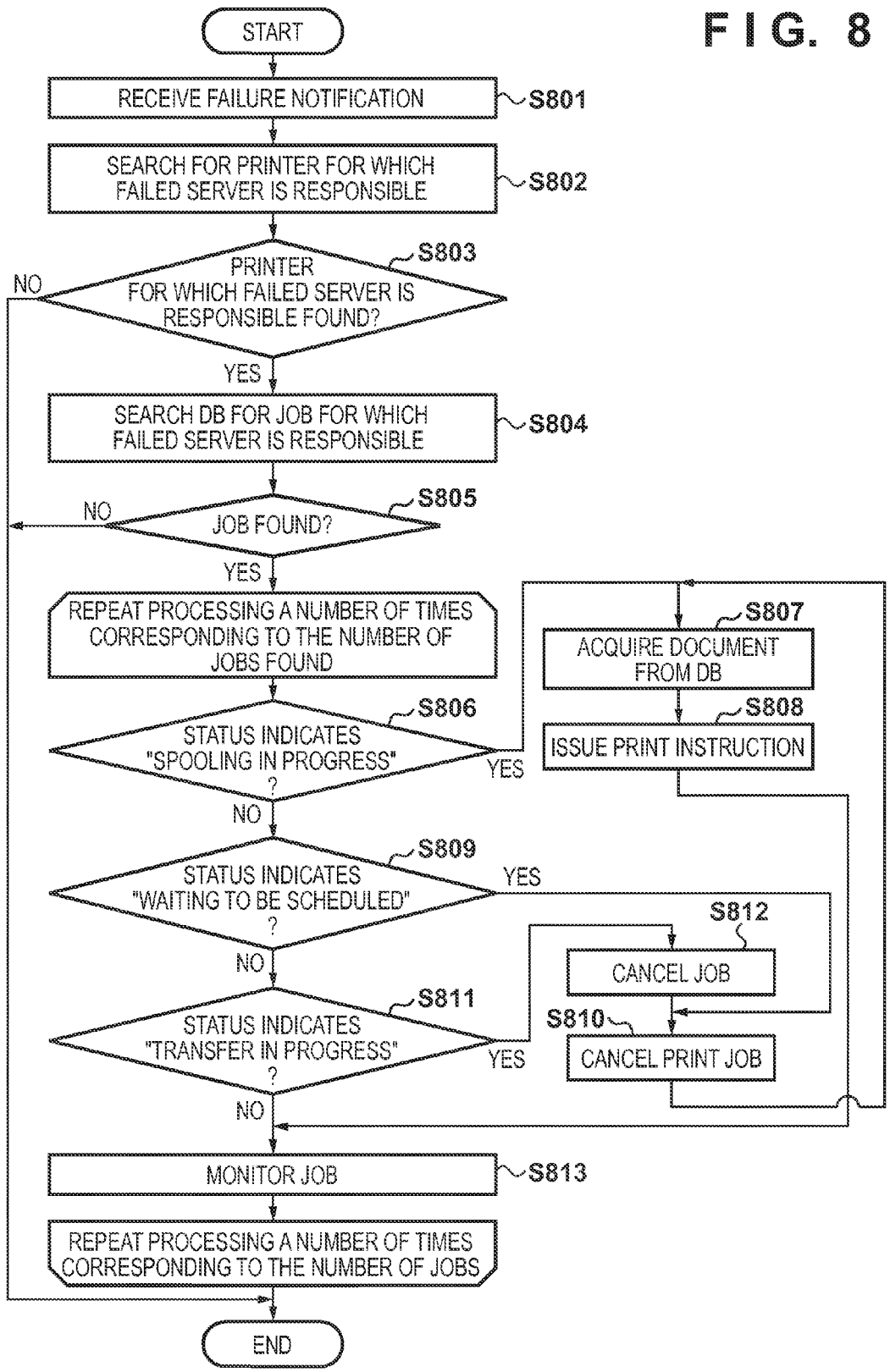
FIG. 8 is a flowchart illustrating processing performed by another printer service 401 if a failure occurs in one print service.

FIG. 8 is a flowchart illustrating processing performed by another print service 401 under control of the load balancer 104 if a failure occurs in one of the print services according to the present embodiment. The failure in the print service includes, for example, a failure occurred in the print server, and a failure occurred in the print service itself such as shutdown of the print service 401. The print servers 101 and 102 are constantly or regularly monitored by the monitor server 105 as to whether they are operating normally. If it is determined that there is a print server that is not operating normally, the monitor server 105 sends a notification indicating that a failure has occurred in the print server to another print service that is being operated by another print server. If the monitor server 105 is configured to constantly monitor the identifiers of the print services that are being operated by the print servers, the monitor server 105 can also send the identifier of the failed print service when sending the failure notification. The procedure shown in FIG. 8 starts when another print service receives the failure notification from the monitor server 105. The destination to which the failure notification is sent is not limited to a print service, and may be a print server.

In S801, the print service 401 receives a notification indicating that a failure has occurred in one of the print services that are under control of the load balancer 104 from the monitor server 105. In the present embodiment, the monitor server 105 is configured to hold the identifiers uniquely assigned to the print services that the monitor server 105 is monitoring (or in other words, monitor targets) including the identifier of another print service to which a failure notification is sent, and send a notification indicating the occurrence of a failure together with the identifier of the failed print service and identification information (for example, IP address) of the print server executing the failed print service 401 when notifying the print service 401 of the failure. The present embodiment is described assuming that the monitor server 105 sends identifier to the print service 401, but the monitor server 105 can send any information such as the IP address of the print server as long as it is possible to specify the print service. As a result of the identifier of the print service, which may be, for example, a value saved in the database 107 by the print service, being notified to another print service, the identifier can be known to the other print server. Alternatively, the identifier of the print service may be notified to the load balancer 104 such that the load balancer can specify the print service.

In S802, the print service 401 searches the printer information 500 so as to determine whether the identifier received in S801 is included in the responsible print service ID 504 of the printer information 500. In other words, a search is performed for a printer for which the failed print service is responsible.

In S803, if a responsible print service ID 504 that matches the identifier of the failed print service is found as a result of the search performed in S802, the print service 401 performs processing of S804. If a responsible print service ID 504 that matches the identifier of the failed print service is not found, the processing ends. The matching (or in other words, corresponding) printer information may also be referred to as the "printer information of interest".

In S804, the print service 401 searches the job information 510 for job information 510 that corresponds to the printer name 501 of the printer information 500 of interest. Prior to S804, the responsible print service ID 504 of the printer information 500 of interest may be replaced by the identifier of the print service 401 that is executing this processing.

In S805, if corresponding print job information 510 is found as a result of the search processing performed in S804, the print service 401 performs processing of S806. If there are a plurality of pieces of corresponding print job information 510, the print service 401 repeatedly performs the processing of S806 and the subsequent steps for each corresponding print job information. If there is no print job information 510, the processing ends.

In S806, the print service 401 focuses on one corresponding print job information, and acquires the status 513 of the print job information 510 of interest. If the status 513 indicates "spooling in progress", the print service 401 performs processing of S807. If the status 513 of the print job information of interest does not indicate "spooling in progress", the print service 401 performs processing of S809.

In S807, the print service 401 acquires document data corresponding to the document ID 514 of the print job information 510 of interest from the database 107. In S808, the print service 401 issues a print instruction to the printer driver 402 based on the document data acquired in S807 and the printer driver name 505. At this time, upon receiving print job data from the printer driver 402 via the job control port monitor 404, the job control service 405 performs transfer processing for transferring the job data (print data) to the printer 103. In addition, at this time, the print data is also saved.

In S809, if the status 513 of the print job information of interest indicates "waiting to be scheduled", the print service 401 performs processing of S810. If the status 513 does not indicate "waiting to be scheduled", the print service 401 performs processing of S811.

In S810, the print service 401 issues, to the job control service 405, a cancel request to cancel the print job (referred to as the "target print job") specified by the job information of interest in the printer (referred to as the "target printer" or "designated printer") specified by the printer information 500 of interest, and then performs processing of steps S807 and S808. At this time, in response to the cancel request from the print service 401, the job control service 405 issues a cancel instruction to cancel the schedule request to the schedule application 701 of the printer 103.

In S811, if the status 513 of the print job information of interest indicates "transfer in progress", the print service 401 performs processing of S812. In S812, the print service 401 issues, to the job control service 405, a cancel instruction to cancel the target print job that is currently being transferred to the printer 103, and performs processing of S810 and processing of steps S807 to S809. Here, in S812, the job control service 405 stops the transfer processing, and in step S810, cancels the target print job a part of which has already been transmitted to the target printer 103. The processing performed in S812 is, for example, rewriting of the status 513 of the print job information of interest to "stop". In S811, if the status does not indicate "transfer in progress", or in other words, for example, if transfer of the print job to the printer has been completed and scheduled (including the case where the print job is being executed), the job is continuously executed.

In S813, the print service 401 monitors the job transferred to the printer 103. At this time, the job control service 405 exchanges the job status and the printer status with the schedule application 701, and issues a notification to the print service 401.

Through the processing described above, in the redundant print servers, even if a failure occurs in the print service of one of the print servers, recovery processing for recovering the failed server can be performed by another print server without sharing of print data in the database or the like.

Embodiment 2

The present embodiment is different from Embodiment 1 in that processing performed by the print service 401 when the printer 103 has already started printing if the status 513 of the print job indicates "transfer in progress" is added. Hereinafter, the processing of the print service 401 according to the present embodiment will be described with reference to FIG. 9. In the present embodiment, the configuration of the system, the configuration of each server, and the configuration of the printer are the same as those of Embodiment 1.

Figure 9:
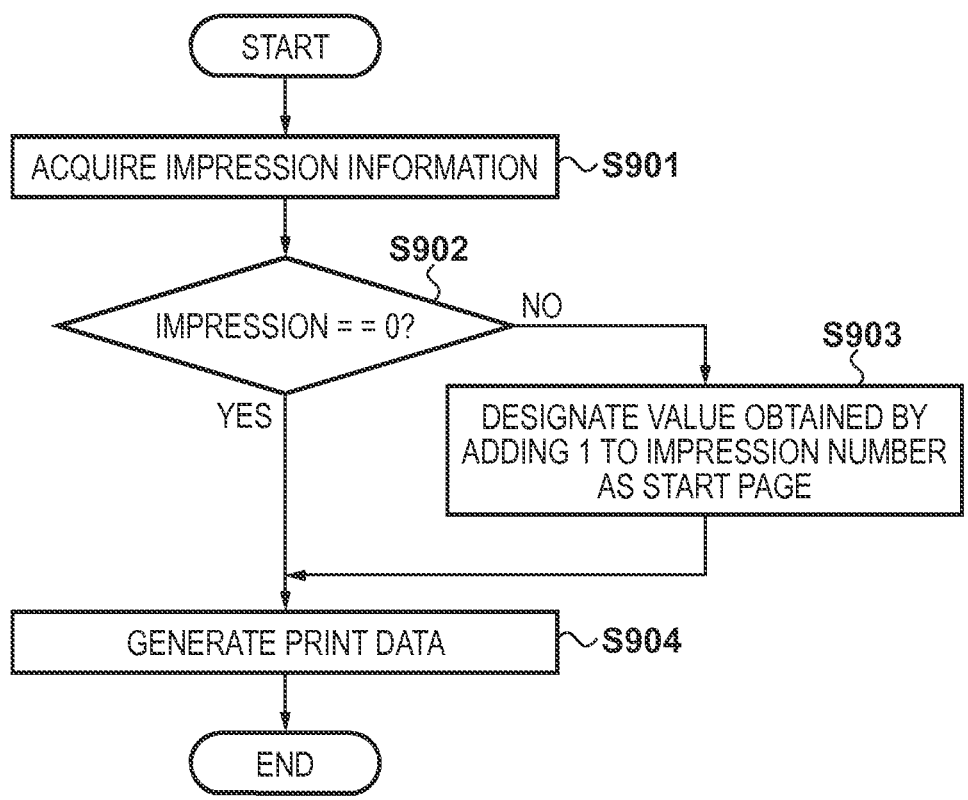
FIG. 9 is a flowchart illustrating processing performed by the print service 401 if the print job status indicates "transfer in progress".

FIG. 9 is a diagram showing a processing flow performed when the printer 103 has already started printing if the print job status 513 indicates "transfer in progress" or "printing in progress". In the procedure shown in FIG. 8, if it is determined in step S811 that the print job status 513 indicates "transfer in progress", in the present embodiment, the print service 401 further acquires a status from the printer 103, and determines whether the acquired status indicates "printing in progress" (not shown). If it is determined that the acquired status does not indicate "printing in progress", the processing branches to S812. If it is determined that the acquired status indicates "printing in progress", FIG. 9 is executed.

In S901, the print service 401 issues a request to acquire paper discharge information (impression information) to the job control service 405. The job control service 405 acquires paper discharge information of the print job specified by the job ID 511 from the schedule application 701.

In S902, the print service 401 checks the paper discharge information acquired in S901, and if the number of sheets of paper discharged is 0, the print service 401 then performs processing of S904. Note that the default value for the start page from which printing starts is set to 1. If the number of sheets of paper discharged is greater than 0, the print service 401 performs processing of S903.

In S903, the print service 401 designates a value obtained by adding 1 to the acquired number of sheets of paper discharged as the start page. As used herein, the start page means the page from which printing starts in the processing performed by the printer 103.

In S904, the print service 401 designates the start page, and issues a request to generate print data to the printer driver 402. In the present embodiment, a method is used in which the start page is designated at the time of generating print data, but it is also possible to use a method in which after generation of print data, a portion for designating the start page in the print data is directly edited. Step S904 can be implemented in the same procedure as, for example, steps S807 and S808 shown in FIG. 8.

It is also possible to skip step S902 shown in FIG. 9 so as to ensure step S903 to be performed, and in S903, set a value obtained by adding 1 to the number of sheets of paper discharged as the start page. Also, if the print start page is not 1, in step S904, a value obtained by adding the print start page designated when the print request was issued to the number of sheets of paper discharged may be set as the print start page. Also, if a print setting such as double-sided printing is designated, the print setting is reflected, and the first page excluding the printed pages is designated as the print start page in S903. With this configuration, it is possible to respond to various types of print settings.

Through the processing described above, even if a failure occurs in a print server and another server performs recovery processing, print processing can be performed without making duplicated printouts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083106, filed Apr. 14, 2014, which is hereby incorporated by reference herein in its entirety.

What is claimed is:

1. A print system comprising:
a plurality of print servers including a first print server and a second print server;
a monitor server configured to monitor operating statuses of the plurality of print servers; and
a database configured to store document data and association information, the association information being information in which a print server, a printer and a status of a print job are associated with each other,
wherein each of the print servers comprises a processor which functions as:
a generating unit configured to generate a print job based on the document data designated by a print request, and transmit the print job to a printer designated by the print request; and
an updating unit configured to, in response to the print request, update the association information stored in the database,
and wherein, if the monitor server determines based on the monitored operating status of the first server that a failure occurs in the first print server, the monitor server notifies the second print server of the failed first print server, and
wherein, if the second print server is notified of the failed first print server from the monitor server, the second print server specifies a target printer and a target print job that are associated with the first print server based on the association information, determines, based on the status of the specified print job, whether the specified print job is continuously executed, generates a second print job based on the document data corresponding to the specified print job if it is determined that the specified print job is not continuously executed, and transmits the generated second print job to the specified printer so as to execute the generated second print job, wherein the second print server does not generate the second print job based on the document data corresponding to the specified print job if it is determined that the specified print job is continuously executed.

2. The print system according to claim 1,
wherein, if the status of the specified print job is waiting to be scheduled in the target printer, the second print server cancels the specified print job that is waiting to be scheduled in the target printer, generates a second print job based on the document data corresponding to the specified print job, and transmits the generated second print job to the specified printer so as to execute the generated second print job.

3. The print system according to claim 1,
wherein, if the status of the specified print job is being transferred to the target printer, the second print server cancels a part of the specified print job that has been transmitted to the target printer, generates a second print job based on the document data corresponding to the specified print job, and transmits the generated second print job to the specified printer so as to execute the generated second print job.

4. The print system according to claim 3,
wherein, if the status of the specified print job is being transferred to and printed by the target printer, the second print server cancels a part of the specified print job that has been transmitted to the target printer, generates a subsequent part of the print data after the printed part of the print data based on the document data corresponding to the specified print job, and transmits the generated print data to the target printer so as to print the print data.

5. The print system according to claim 1,
wherein the plurality of print servers are redundant print servers that are made be able to be redundant by a load balancer.

6. A print server connected to at least one other print server, a monitor server configured to monitor operating statuses of the print servers, and a database configured to store document data and association information, the association information being information in which a print server, a printer and a status of a print job are associated with each other, the print server comprising a processor which functions as:
   a receiving unit configured to receive a notification indicating that a failure has occurred in the other print server from the monitor server;
   a specifying unit configured to specify a target printer and a target print job that are associated with the first print server based on the association information;
   a determination unit configured to determine, based on the status of the specified print job, whether the specified print job is continuously executed;
   a generation unit configured to generate a second print job based on the document data corresponding to the specified print job if the determination unit determines that the specified print job is not continuously executed; and
   a transmission unit configured to transmit the generated second print job to the specified printer so as to execute the print job,
   wherein the second print server does not generate the second print job based on the document data corresponding to the specified print job if the determination unit determines that the specified print job is continuously executed.

7. The print server according to claim 6,
wherein if the status of the specified print job is waiting to be scheduled in the target printer, the print server cancels the specified print job that is waiting to be scheduled in the target printer.

8. The print server according to claim 6,
wherein if the status of the specified print job is being transmitted to the target printer, the print server cancels a part of the print job that has been transmitted to the target printer.

9. The print server according to claim 8,
wherein if the status of the specified print job is being transferred to and printed by the target printer, the second print server cancels a part of the specified print job that has been transmitted to the target printer, and the generation unit generates a subsequent part of the print data after the printed part of the print data based on the document data corresponding to the specified print job, and the transmission unit transmits the generated print data to the target printer.

10. A print control method for use in a print system including a plurality of print servers, a monitor server configured to monitor operating statuses of the print servers, and a database configured to store document data and association information, the association information being information in which a print server, a printer and a status of a print job are associated with each other, the method comprising:
    a notification step of, if a failure occurs in a first print server, notifying a second print server of the failed print server, which is performed by the monitor server;
    a step of specifying a target printer and a target print job that are associated with the first print server based on the association information;
    a determining step of determining, based on the status of the specified print job, whether the specified print job is continuously executed;
    a generating step of generating a second print job based on the document data corresponding to the specified print job if the determining step determines that the specified print job is not continuously executed; and
    a step of transmitting the generated second print job to the specified printer so as to execute the print job,
    wherein the second print server does not generate the second print job based on the document data corresponding to the specified print job if it is determined that the specified print job is continuously executed.

11. A non-transitory computer-readable medium storing a program for causing a print server to execute a print control method, the print server being connected to at least one other print server, a monitor server configured to monitor operating statuses of the print servers, and a database configured to store document data and association information, the association information being information in which a print server, a printer and a status of a print job are associated with each other, the method comprising:
    receiving a notification indicating that a failure has occurred in the other print server from the monitor server;
    specifying a target printer and a target print job that are associated with the first print server based on the association information;
    determining, based on the status of the specified print job, whether the specified print job is continuously executed;
    generating a second print job based on the document data corresponding to the specified print job if it is determined that the specified print job is not continuously executed; and
    transmitting the generated second print job to the specified printer so as to execute the print job,
    wherein the second print server does not generate the second print job based on the document data corresponding to the specified print job if it is determined that the specified print job is continuously executed.

* * * * *